3,377,408
BLEND OF 1-MONOOLEFIN AND TRIMETHYLENE SULFIDE POLYMERS
James T. Edmonds, Jr., Bartlesville, Okla., assignor to Phillips Petroleum Company, a corporation of Delaware
No Drawing. Filed Nov. 5, 1963, Ser. No. 321,422
9 Claims. (Cl. 260—897)

This invention relates to a blend of 1-monoolefin and trimethylene sulfide polymers as a new composition of matter. In another aspect, it relates to a process for preparing such a blend.

Many different processes have been proposed or patented for the production of different types of resinous, plastic and elastomeric polymers and a host of such polymers are now in widescale commercial production. High molecular weight solid polymers of 1-monoolefins, such as polyethylene and copolymers of ethylene and 1-butene, are exemplary of such polymers and they are commercially produced for a wide variety of applications, such as fibers, film, bottles, pipe, etc. However, some of the physical properties of these polymers, such as their oxidative stability and colorability, are not as good as that desired for many of their applications.

Accordingly, an object of this invention is to produce a blend of 1-monoolefin and trimethylene sulfide polymers. Another object is to provide a process for preparing such a blend. Another object is to improve the stability toward oxidative degradation and the colorability of 1-monoolefin polymers. Further objects and advantages of this invention will become apparent to those skilled in the art from the following description and appended claims.

Briefly, I have found that novel, homogenous solid polymeric compositions can be obtained by blending together high molecular weight solid 1-monoolefin polymers, such as polyethylene or copolymers of ethylene and 1-butene, with trimethylene sulfide polymers.

Any suitable blending technique which will produce a homogenous mixture of the 1-monoolefin and trimethylene sulfide polymers can be used. A convenient technique for preparing the blends is to mix the two polymeric materials in comminuted solids in a kneading device, such as a Banbury mixer or roll mill, which melts and mixes the polymers. The blending operation is conducted at a temperature above the melting points of the two polymers but below that at which degradation of the polymers occurs; temperatures usually in the range of 250 to 400° F. will be generally suitable for blending. The blending operation is continued until a homogenous mixture of the polymers is obtained, which will usually be 10 to 15 minutes. Alternatively, the blends can be prepared by the solution blending technique wherein the polymers are dissolved in a suitable solvent and the resulting blend recovered from solution, for example, by cooling and precipitating and/or vaporizing the solvent. Suitable solvents for this purpose include hydrocarbons such as benzene, toluene, cyclohexane, and hexane and halogenated hydrocarbons such as chlorobenzene.

The novel polymeric blends of this invention have improved stability toward oxidative degradation, improved receptivity and retention for organic dyes, and higher melt indexes than the 1-monoolefin polymer component. Greater amounts of the blend can be extruded at a given temperature and/or pressure than is possible when the 1-monoolefin polymer alone is processed. Thus, these novel blends can be used in the fabrication of a wide variety of items, for example, by extrusion, injection molding, vacuum forming, blow molding and the like, for example to make fibers, films, bottles, pipe, etc. The polymer blends can have incorporated therein anti-oxidants, pigments, extenders, plasticizers, cross linking agents, and other additives, if desired.

The 1-monoolefin polymers employed according to this invention include the solid homopolymers of 1-monoolefins having 2 to 8 carbon atoms, inclusive, as well as copolymers of these 1-monoolefins with each other. Representative 1-monoolefin polymers which can be used in this invention include polyethylene, polypropylene, ethylene-propylene copolymers, ethylene-1-butene copolymers, ethylene-1-pentene copolymers, and the like. Generally, in the case of the copolymers formed by copolymerization of ethylene and a second 1-monoolefin, the amount of the latter present during formation of the copolymers will be about 1 to 10 weight percent, preferably 3 to 5 weight percent, of the total monomers charged to the polymerization zone. Ethylene homopolymers and copolymers of ethylene with 1-monoolefins such as propylene and 1-butene are preferred according to this invention and they have densities ranging from 0.930 to 0.990, preferably 0.940 to 0.970 (ASTM D1505–57T). It is also within the scope of this invention to incorporate polyisobutylene into a polyethylene and trimethylene sulfide polymer blend, for example to make a blend suitable for use in formation of bags.

The polyolefins or 1-monoolefin polymers employed according to the invention can be prepared by any of the well-known methods which are usually employed in the preparation of these polymers. One well-known method for preparing polymers of 1-monoolefins is the chromium oxide-catalyzed polymerization described in the Hogan et al. patent, U.S. 2,825,721 (1958). The polyolefins prepared by Hogan et al. are characterized by their high density and high crystallinity. Other suitable methods for preparing the monoolefin polymers involves polymerization of the monoolefin material with initiator systems comprising mixtures of an organometal, a metal hydride, or an elemental metal of Groups I, II and III of the Periodic Table with a salt of alcoholate of the metal of Groups IV, V, VI and VIII of the Periodic Table. (The Periodic Table referred to herein is shown on pages 448–449 of the Handbook of Chemistry and Physics, 34th edition, published by Chemical Rubber Publishing Company, at Cleveland, Ohio.)

The novel polymeric blends of this invention will comprise a major amount of the polyolefin component and a minor amount of the trimethylene sulfide polymer component. Generally, the trimethylene sulfide polymer will amount to about 0.5 to 49 weight percent of the blend, usually 0.5 to 25 weight percent of the blend, and preferably less than 10 weight percent of the blend.

The trimethylene sulfide polymers used in this invention are also known and they include both the homopolymers of trimethylene sulfides and copolymers of trimethylene sulfides with polymerizable vinyl-substituted comonomers, such as styrene. These trimethylene sulfide polymers can range from soft, oily resinous materials to highly elastomeric materials to highly crystalline materials, depending on the monomeric materials polymerized and the conditions of polymerization. They can be polymerized in the presence of suitable catalysts such as organo-alkali metal compounds, e.g., n-butyllithium, alkali metals, e.g., sodium, and acid type catalysts, e.g., $AlCl_3$, $BF_3$, HF and the like. Such polymerization reactions are generally carried out at temperatures ranging from 0 to 150° C. at autogenous pressure in the absence or the presence of such diluents as ethers and amides. Reaction times will vary and be dependent upon the catalyst chosen and the reaction temperature and usually will be from a few minutes to as long as 100 hours.

The catalyst level will also vary widely and will be dependent upon the type of catalyst chosen. For example, where an organo-alkali metal compound such as n-butyllithium is used, a suitable catalyst level is from 0.25 to 100 millimoles per mole of the trimethylene sulfide. Following the polymerization reaction, the polymer is generally recovered as a precipitate by filtration or equivalent means, and is washed and dried. A preferred method of preparing these trimethylene sulfide polymers is that disclosed and claimed in my copending application, Ser. No. 310,863, filed Sept. 23, 1963.

The trimethylene sulfides which are homopolymerized or copolymerized with a vinyl-substituted comonomer and blended with the 1-monoolefin polymers, according to this invention, can be represented by the general formula:

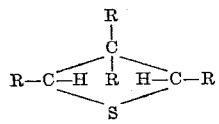

I where each R is selected from the group consisting of hydrogen and alkyl, aryl, and cycloalkyl radicals, and combinations of said radicals, such as alkaryl, aralkyl, alkylcycloalkyl, arylcycloalkyl, cycloalkylalkyl, cycloalkylaryl, arylcycloalkylalkyl, and the like. R can contain substituent groups that are inert or unreactive in the polymerization reaction of this invention, though I prefer to employ hydrocarbon radicals as R without such substituent groups. And, I prefer that where the R's are hydrocarbon radicals that the number of carbon atoms in each be in the range of 1 to 10, inclusive, and that the total number of carbon atoms in the trimethylene sulfide compound does not exceed 15.

The trimethylene sulfides and their preparation are known in the prior art, and the simplest member of this class, viz., trimethylene sulfide (or thiacyclobutane), is the preferred member of the class to be used in making the polymers of this invention, especially since it is presently commercially available. This latter compound can be prepared by the reaction of 1,3-dichloro- or 1,3-dibromopropane with sodium sulfide. Another method of preparing it, and other members of the class, is by reacting a 3-chloropropyl mercaptan with a base such as sodium hydroxide.

Representative trimethylene sulfides coming within the scope of Formula I which can be used in the practice of this invention include: trimethylene sulfide, 2-methyltrimethylene sulfide, 3-methyltrimethylene sulfide, 2,3-dimethyltrimethylene sulfide, 2,4-dimethyltrimethylene sulfide, 3,3-dimethyltrimethylene sulfide, 2,3,4-trimethyltrimethylene sulfide, 2,3,3,4-tetramethyltrimethylene sulfide, 2-ethyltrimethylene sulfide, 3-ethyltrimethylene sulfide, 3,3-diethyltrimethylene sulfide, 3-methyl-3-ethyltrimethylene sulfide, 2-methyl-3,3-diethyltrimethylene sulfide, 2-methyl-4-n-butyltrimethylene sulfide, 2,4-di-n-hexyltrimethylene sulfide, 2-sec-decyltrimethylene sulfide, 2-ethyl-3-sec-decyltrimethylene sulfide, 2-cyclopentyltrimethylene sulfide, 3-cyclohexyltrimethylene sulfide, 2,4-dicyclohexyltrimethylene sulfide, 2-(4-methylcyclohexyl)trimethylene sulfide, 2-phenyltrimethylene sulfide, 3-p-tolyltrimethylene sulfide, 2-(4-n-butylphenyl)trimethylene sulfide, 2-benzyl-3-tert-butyltrimethylene sulfide, 2-(3-cyclopentylphenyl)trimethylene sulfide, 2-methyl-3-isopropyl-4-p-tolyltrimethylene sulfide, 2-(3-phenylcyclopentyl)methyltrimethylene sulfide, 2-naphthyltrimethylene sulfide, and the like, including mixtures thereof.

As mentioned above, the trimethylene sulfides can be copolymerized with a polymerizable vinyl-substituted compound. The latter compounds include conjugated dienes, such as those having 4 to 12 carbon atoms per molecule, and compounds which can be represented by the general formula:

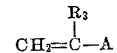

II where $R_3$ is selected from the group consisting of hydrogen, lower alkyl (e.g., methyl, ethyl, propyl, etc.) and chloro, and A is selected from the group consisting of carboxy, cyano, carbamyl, carboalkoxy (e.g., carbomethoxy, carboethyoxy, carbopropoxy, etc.) and the radicals:

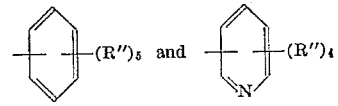

where R" is selected from the group consisting of hydrogen, vinyl, halogen and lower alkyl.

Representative conjugated dienes which can be copolymerized with any one of the above-mentioned trimethylene sulfides include: 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2-methyl-3-ethyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 2-chloro-1,3-butadiene, 3-butyl-1,3-octadiene, 3,4-dimethyl-1,3-hexadiene, 3-n-propyl-1,3-pentadiene, 4,5-diethyl-1,3-octadiene, 2-phenyl-1,3-butadiene, 2,3-diethyl-1,3-butadiene, 2,3-di-n-propyl-1,3-butadiene, 2-methyl-3-isopropyl-1,3-butadiene, and the like, and mixtures thereof.

Representative vinyl-substituted compounds coming within the scope of Formula II which can be copolymerized with any one of the above-mentioned trimethylene sulfides, or copolymerized with the latter and any one of the above-mentioned conjugated dienes, include: styrene, alpha-methylstyrene, 4-methylstyrene, 3-chlorostyrene, 4-ethylstyrene, 3-n-butylstyrene, 4-isopropylstyrene, 4-bromostyrene, 4-tert-butylstyrene, and divinyl benzene; unsaturated aliphatic carboxylic acids, such as acrylic acid, methacrylic acid, ethacrylic acid, propyacrylic acid, 2-chloroacrylic acid, etc.; nitriles, such as acrylonitrile, ethacrylonitrile, etc.; the corresponding amides, such as acrylamide, methacrylamide, ethacrylamide, etc.; esters, such as methyl acrylate, ethyl acrylate, propyl acrylate, butyl acrylate, methyl methacrylate, ethyl methacrylate, propyl methacrylate, butyl methacrylate, methyl ethacrylate, ethyl ethacrylate, methyl 2-chloroacrylate; heterocyclic nitrogen compounds, such as 2-vinylpyridine, 2-methyl-5-vinylpyridine, etc.; and the like.

Where the trimethylene sulfide is copolymerized with one or more vinyl-substituted comonomers, such as 1,3-butadiene and styrene, the copolymers formed can be random copolymers or block copolymers, or combinations of the two within the same molecule, that is, a block copolymer where one of the blocks is a random copolymer. In preparing the random copolymers, the various monomers are all charged at the same time to the polymerization reactor. In preparing the block copolymers, one or more of the vinyl-substituted comonomers can be charged initially, allowing the same to polymerize, and then the trimethylene sulfide can be charged, allowing the latter to polymerize. Alternatively, the trimethylene sulfide can be charged and polymerized first and the vinyl-substituted comonomer(s) thereafter, to form block copolymers. In any case, where such random or block copolymers are prepared, the trimethylene sulfide will usually make up from 10 to 90 weight percent of the copolymer, and where the vinyl-substituted comonomers make up the rest of the copolymer.

The objects and advantages of this invention are further illustrated in the following examples, but it should be understood that the various materials, conditions and other details recited in these examples should not be construed to unduly limit their invention.

Example I

Five grams of the homopolymer of trimethylene sulfide, or poly(trimethylene sulfide), was milled with 50 grams of a commercial polypropylene (Profax Type 6420F–Hercules) having the properties set forth in Table I.

TABLE I

| Property: | | |
|---|---|---|
| Melt Index (ASTM D1238–57T, procedure F) (meas. at 230° C.) | value | 3.1 |
| Density (ASTM D1505–57T) | do | 0.9066 |
| Hardness (Shore D) | do | 77 |
| Tensile strength (ASTM D638–58T) | p.s.i. | 5150 |
| Elongation (ASTM D638–58T) | percent | 15 |

The milling of the poly(trimethylene sulfide) and polypropylene was carried out for 400 seconds on a rubber mill at approximately 300° F. For purposes of comparison, a control sample of the polypropylene was similarly milled. Samples of the resulting milled blend of this invention and the milled control sample were molded into slabs at 180° C. and placed in an air oven at 100° C. and aged for 16 hours. The aged polypropylene control sample oxidatively degenerated and was very brittle after exposure to these oxidizing conditions, whereas the aged blend of this invention showed no apparent change. These runs show the blended polymeric materials of this invention are more stable to oxidative degradation than the 1-olefin polymers.

Example II

A copolymer of ethylene and 1-butene, prepared by the chromium oxide-catalyzed polymerization process described in Hogan et al. U.S. Patent 2,825,721 was blended on a steam heated roll mill at 302° F. with a polymer of trimethylene sulfide prepared by polymerizing trimethylene sulfide with n-butyllithium. The resulting polymeric blend, made up of 97 weight percent of the ethylene-1-butene copolymer and 3 weight percent of the trimethylene sulfide polymer, was cooled and its physical properties determined. The properties of the blend are set forth in Table II, together with the properties of the ethylene-1-butene polyolefin.

TABLE II

| Property | Blend | Polyolefin |
|---|---|---|
| Melt Index (ASTM D1238–57T, Procedure F) | 0.335 | 0.303 |
| Density (ASTM D1505–57T) | 0.9563 | 0.9492 |
| Hardness (Shore D) | 67 | 68 |
| Tensile Strength (ASTM D638–58T), p.s.i. | 3,907 | 3,910 |
| Elongation (ASTM D638–58T) | 47 | 40 |

A sample of the blend was dyed with Rit All-Purpose dye and it exhibited greatly improved dyeability when compared to the dyeability of the olefin copolymer alone.

Example III

An ethylene-1-butene copolymer, like that used in Example II, was milled at 320° F. on a rubber mill until fluid and then poly(trimethylene sulfide) was added and the mixture milled until homogeneous. The resulting blend of 97 weight percent olefin copolymer and 3 weight percent poly(trimethylene sulfide) was molded into a film and the film cut into strips. A strip of the film was placed in each of six different colors of Rit All-Purpose dye (yellow, blue, red, green, orange and purple). A control strip of the olefin copolymer alone was also placed in each dye solution for purposes of comparison. The dye solutions were heated to simmer for one hour, at which time the strips were removed, washed with water, then with acetone, and again with water. In all cases, a much brighter, more permanent color was imparted to the strips of the polymer blend of this invention than to the ethylene-1-butene copolymer control.

Various modifications and alterations of this invention will become apparent to those skilled in the art without departing from the scope and spirit of this invention, and it should be understood that this invention is not to be limited to the illustrative embodiments set forth herein.

I claim:

1. A composition comprising a blend of a major amount of solid polymer of a 1-monoolefin having 2–8 carbon atoms, inclusive, and a minor amount of a solid polymer of a monomer comprising at least 10 weight percent of at least one trimethylene sulfide having the general formula

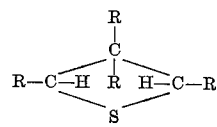

where each R is selected from the group consisting of hydrogen, alkyl, aryl, and cycloalkyl radicals, and the combination of such radicals, said radicals having from 1 to 10 carbon atoms.

2. A composition comprising a blend of a solid polymer of a 1-monoolefin having 2 to 8 carbon atoms and about 0.5 to 49 weight percent of a solid polymer of at least one monomer consisting of at least one trimethylene sulfide having the general formula

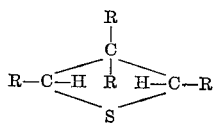

where each R is selected from the group consisting of hydrogen, alkyl, aryl, and cycloalkyl radicals, and combination of such radicals, said radicals having from 1 to 10 carbon atoms.

3. A process which comprises blending a solid polymer of a 1-monoolefin having 2 to 8 carbon atoms, inclusive, and a solid polymer of a monomer comprising at least 10 weight percent of at least one trimethylene sulfide having the general formula

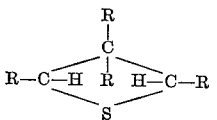

where each R is selected from the group consisting of hydrogen, alkyl, aryl, and cycloalkyl radicals, and combinations of such radicals, said radicals having from 1 to 10 carbon atoms, at a temperature within the range of about 250–400° F. until a homogeneous mixture of the polymers is obtained.

4. The composition of claim 2 wherein said polymer of a 1-monoolefin is polypropylene, R in said general formula is hydrogen, and less than 10 weight percent based on the total weight of the mixture of said polymer of trimethylene sulfide.

5. A process according to claim 3 wherein said polymer of a 1-monoolefin is polypropylene, R in said general formula is hydrogen, and there is used less than 10 weight percent based on the total weight of the mixture of said polymer of trimethylene sulfide.

6. The composition of claim 4 wherein said polyolefin is polypropylene, said composition having less than 10 weight percent of said trimethylene polymer wherein said R is hydrogen.

7. The composition of claim 4 wherein said polyolefin is ethylene-1-butene copolymer, said composition having less than 10 weight percent poly(trimethylene sulfide).

8. The process according to claim 5 wherein said 1-monoolefin polymer is polypropylene.

9. The process according to claim 5 wherein said 1-monoolefin polymer is an ethylene-1-butene copolymer.

References Cited

UNITED STATES PATENTS

| 3,154,479 | 10/1964 | Muroi et al. | 260—897 |
| 3,156,743 | 11/1964 | Coover et al. | 260—897 |
| 3,182,105 | 5/1965 | Bonvicini et al. | 260—897 |

OTHER REFERENCES

Chemical Reviews 49, Tarbell et al., p. 22 (1951).

SAMUEL H. BLECH, *Primary Examiner.*

MURRAY TILLMAN, *Examiner.*

T. G. FIELD, JR., *Assistant Examiner.*